United States Patent
Chang et al.

(10) Patent No.: US 11,209,723 B2
(45) Date of Patent: Dec. 28, 2021

(54) OPTICAL MODULE AND PROJECTOR

(71) Applicant: Coretronic Corporation, Hsin-Chu (TW)

(72) Inventors: Yi Chang, Hsin-Chu (TW); Shu-Yu Lin, Hsin-Chu (TW); Chien-Sheng Liu, Tainan (TW); Chun-Min Wu, Kaohsiung (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/137,372

(22) Filed: Dec. 30, 2020

(65) Prior Publication Data

US 2021/0200071 A1    Jul. 1, 2021

(30) Foreign Application Priority Data

Dec. 31, 2019   (CN) .......................... 201922462386.9

(51) Int. Cl.
*G03B 21/14* (2006.01)
*H02K 35/04* (2006.01)
*G03B 5/00* (2021.01)

(52) U.S. Cl.
CPC ............ *G03B 21/142* (2013.01); *G03B 5/00* (2013.01); *G03B 21/145* (2013.01); *H02K 35/04* (2013.01)

(58) Field of Classification Search
CPC .. G03B 21/14; G03B 21/2073; G03B 21/006; G03B 5/083; G02B 27/28; G02B 2413/01; G02B 2413/07; G02B 2413/08; G02F 1/13363

USPC .......................................................... 353/20
See application file for complete search history.

(56) References Cited

U.S. PATENT DOCUMENTS

| | | | |
|---|---|---|---|
| 2020/0004123 A1* | 1/2020 | Chang | G02F 1/091 |
| 2020/0174350 A1* | 6/2020 | Chang | G03B 21/142 |
| 2020/0174357 A1* | 6/2020 | Chen | G03B 21/147 |
| 2020/0201150 A1* | 6/2020 | Chen | G03B 21/142 |
| 2020/0264445 A1* | 8/2020 | Chen | G03B 21/145 |
| 2020/0278593 A1* | 9/2020 | Lin | G03B 21/142 |
| 2021/0026230 A1* | 1/2021 | Liu | H04N 9/317 |
| 2021/0333692 A1* | 10/2021 | Rudnick | H04N 5/2254 |

FOREIGN PATENT DOCUMENTS

| | | |
|---|---|---|
| TW | M260054 | 3/2005 |
| TW | 201813261 | 4/2018 |

* cited by examiner

*Primary Examiner* — William C. Dowling
(74) *Attorney, Agent, or Firm* — JCIPRNET (57) ABSTRACT

An optical module and a projector including the optical module are provided. The optical module includes a base, a first frame body disposed in the base, an optical element disposed in the first frame body, and at least one driving assembly disposed between the base and the first frame body. The first frame body is configured to swing relative to the base through a magnetic force generated by the at least one driving assembly, and each of the at least one driving assembly includes a coil and a magnetic structure that is separated from the coil and includes a magnetic permeable plate, a separation medium, and a magnet element. The separation medium is located on one side of the magnetic permeable plate facing the coil. The magnet element is disposed on the side of the magnetic permeable plate facing the coil and is separated by the separation medium.

12 Claims, 7 Drawing Sheets

OPTICAL MODULE AND PROJECTOR

CROSS-REFERENCE TO RELATED APPLICATION

This application claims the priority benefit of China application serial no. 201922462386.9, filed on Dec. 31, 2019. The entirety of the above-mentioned patent application is hereby incorporated by reference herein and made a part of this specification.

BACKGROUND OF THE INVENTION

Field of the Invention

The invention relates to an optical module and a projector, and particularly relates to an optical module with an increased frequency of reciprocating deflection and a projector including the same.

Description of Related Art

A projector is a display device for generating images. An imaging principle of the projector is to convert an illumination light beam generated by a light source into an image light beam through a light valve and then project the image light beam onto a screen or a wall surface through a projection lens. However, under the tendency toward production of existing size compact projectors and the requirement thereof for achieving high resolution, the light valve has gradually failed to meet a market demand. In order to achieve the high resolution in a small-size projector, an optical module capable of implementing optical vibration may be additionally configured to further improve the resolution of the image converted by the light valve. The above-mentioned optical module may swing in different directions through a Lorentz force (i.e., an electromagnetic force) generated by a driving assembly, thereby compositing an image with a resolution several times greater than an original resolution by quickly moving the image light beam within one frame, so as to achieve the high resolution. Based on the above description, a magnitude of the Lorentz force generated by the driving assembly is closely related to the resolution of the image.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention is directed to an optical module and a projector, in which a driving assembly is capable of generating an increased Lorentz force.

In order to achieve one or a portion of or all of the objects or other objects, the invention provides an optical module including a base, a first frame body, an optical element, and at least one driving assembly. The first frame body is disposed in the base. The optical element is disposed in the first frame body. The at least one driving assembly is disposed between the base and the first frame body. The first frame body is configured to swing relative to the base through a magnetic force generated by the at least one driving assembly, and each of the at least one driving assembly includes a coil and a magnetic structure, wherein the magnetic structure is separated from the coil. The magnetic structure includes a magnetic permeable plate, a separation medium, and a magnet element. The magnetic permeable plate includes a long side and a short side. The separation medium is located on one side of the magnetic permeable plate facing the coil. The magnet element is disposed on the side of the magnetic permeable plate facing the coil and is separated by the separation medium.

In order to achieve one or a portion of or all of the objects or other objects, the invention provides a projector including an illumination system, a light valve, a projection lens, and an optical module. The illumination system is configured to emit an illumination light beam. The light valve is located on a transmission path of the illumination light beam, and is configured to convert the illumination light beam into an image light beam. The projection lens is located on a transmission path of the image light beam, and is configured to project the image light beam. The optical module includes a base, a first frame body, an optical element, and at least one driving assembly. The first frame body is disposed in the base. The optical element is disposed in the first frame body. The at least one driving assembly is disposed between the base and the first frame body. The first frame body is configured to swing relative to the base through a magnetic force generated by the at least one driving assembly, and each of the at least one driving assembly includes a coil and a magnetic structure, wherein the magnetic structure is separated from the coil. The magnetic structure includes a magnetic permeable plate, a separation medium, and a magnet element. The magnetic permeable plate includes a long side and a short side. The separation medium is located on one side of the magnetic permeable plate facing the coil. The magnet element is disposed on the side of the magnetic permeable plate facing the coil and is separated by the separation medium.

In light of the above, the embodiments of the invention at least demonstrate one or more of the advantages or effects below. In the optical module provided in one or more embodiments of the invention, the magnetic structure includes the separation medium to separate the magnet elements, whereby a magnetic flux density throughout the coil is increased, and the Lorentz force of the coil is accordingly increased. As such, a frequency of reciprocating deflection of the optical module is increased. Accordingly, an image with a resolution several times greater than an original resolution is synthesized by quickly moving the image light beam within one frame, so that a higher 2K resolution image or a 4K resolution image may be obtained.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
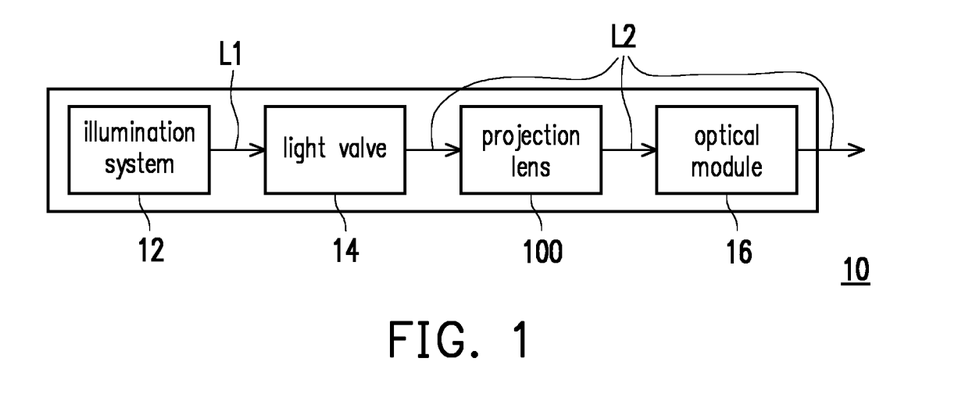
FIG. 1 is a schematic diagram of a projector according to an embodiment of the invention.

FIG. 1 is a schematic diagram of a projector according to an embodiment of the invention. With reference to FIG. 1, a projector 10 of the embodiment includes an illumination system 12, a light valve 14, a projection lens 16, and an optical module 100. The illumination system 12 is configured to emit an illumination light beam L1. The light valve 14 is, for example, located on a transmission path of the illumination light beam L1, and is configured to convert the illumination light beam L1 into an image light beam L2. In some embodiments, the light valve 14 may be a digital micro-mirror device (DMD). In other embodiments, the light valve 14 may also be a reflective light modulator such as a liquid crystal on silicon panel (LCoS panel), etc., or a transmissive light modulator such as a transparent liquid crystal panel, an electro-optical modulator, a magneto-optic modulator, an acousto-optic modulator (AOM), etc. The projection lens 16 is located on a transmission path of the image light beam L2, and is configured to project the image light beam L2. The projection lens 16, for example, includes a combination of one or more optical lenses having refractive power, such as various combinations of non-planar lenses such as a biconcave lens, a biconvex lens, a concavo-convex lens, a convexo-concave lens, a plano-convex lens, a plano-concave lens, etc. In other embodiments, the projection lens 16 may also include a planar optical lens, which projects the image light beam L2 to a projection target in a reflective manner. The form and the type of the projection lens 16 are not limited by the invention. The optical module 100 is, for example, disposed between the light valve 14 and the projection lens 16, and is configured to perform optical vibration to enhance a resolution of the image light beam L2 converted by the light valve 14.

Figure 2:
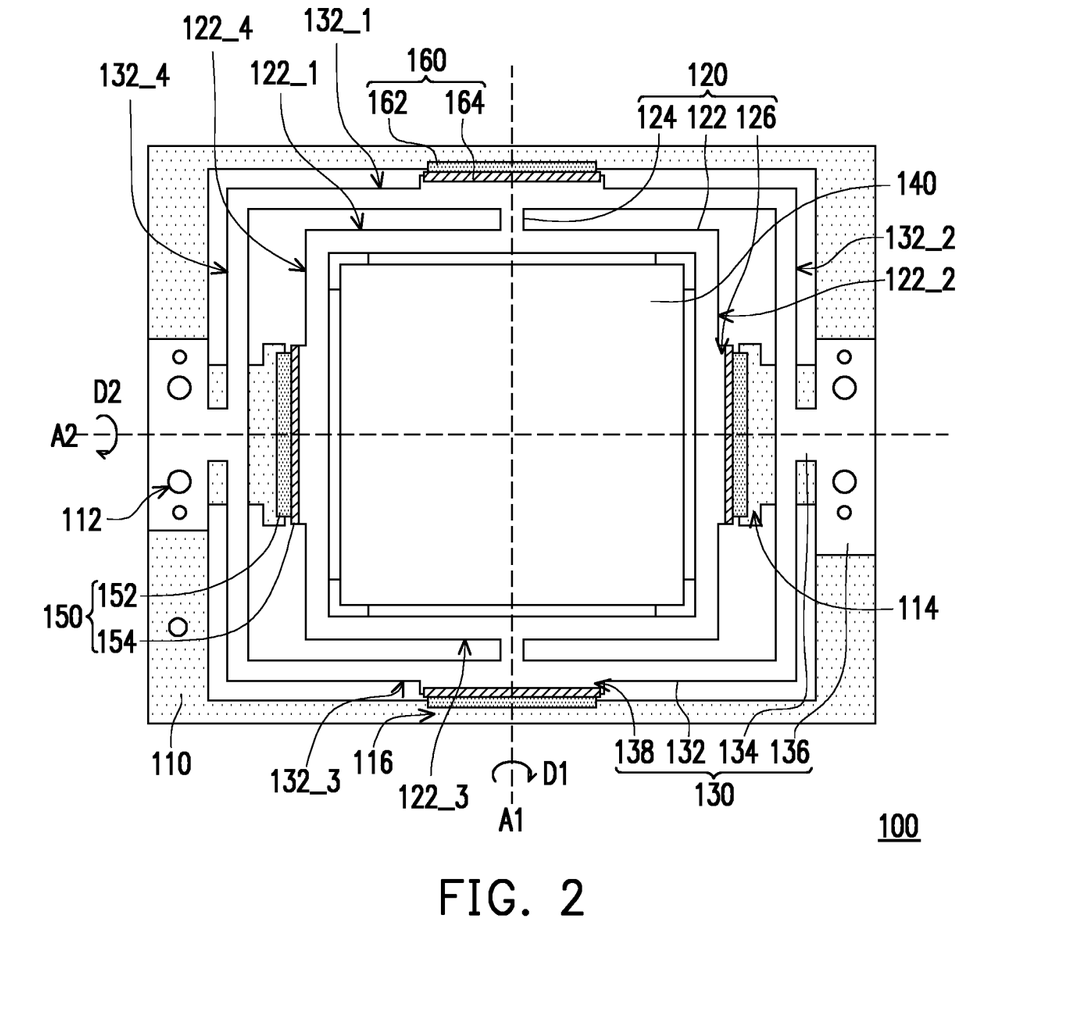
FIG. 2 is a schematic diagram of the optical module depicted in FIG. 1 according to a first embodiment of the invention.

FIG. 2 is a schematic diagram of the optical module depicted in FIG. 1 according to a first embodiment of the invention. In the embodiment, the optical module 100 includes a base 110, a first frame body 120, a second frame body 130, an optical element 140, at least one first driving assembly 150 (two first driving assemblies 150 are illustrated in FIG. 2) and at least one second driving assembly 160 (two second driving assemblies 160 are illustrated in FIG. 2).

In some embodiments, the base 110 may include positioning portions 112 and assembling portions 114 and 116. The positioning portions 112 of the base 110 may fix the second frame body 130 to the base 110 through, for example, locking members (not shown). The assembling portion 114 and the assembling portion 116 of the base 110 may be respectively used for clamping the first driving assembly 150 and the second driving assembly 160, which will be described in detail below.

In some embodiments, the first frame body 120 is disposed in the second frame body 130 and is connected to the second frame body 130, but the invention is not limited thereto. In some other embodiments, when the second frame body 130 is not provided, the first frame body 120 is disposed in the base 110 and is connected to the base 110. The first frame body 120 may include, for example, a first frame portion 122, a first shaft portion 124, and a first assembling portion 126, where the first frame portion 122, the first shaft portion 124, and the first assembling portion 126 may be formed integrally, but the invention is not limited thereto. The first frame portion 122 of the first frame body 120 may be used to carry the optical element 140. The first shaft portion 124 of the first frame body 120 is, for example, disposed on two opposite sides 122_1 and 122_3 of the first frame portion 122, and is configured to connect the second frame body 130. Therefore, the first frame body 120 is configured to take the first shaft portion 124 as a rotation axis, such that the first frame body 120 may swing relative to the second frame body 130 while taking an axis A1 passing through the first shaft portion 124 as the rotation axis. The first assembling portion 126 of the first frame body 120 may be used, for example, for clamping the first driving assembly 150, which will be described in detail below.

In some embodiments, the second frame body 130 may include a second frame portion 132, a second shaft portion 134, a fixing portion 136, and a second assembling portion 138, where the second frame portion 132, the second shaft portion 134, the fixing portion 136, and the second assembling portion 138 may be formed integrally, but the invention is not limited thereto. The second shaft portion 134 of the second frame body 130 is, for example, disposed at two opposite sides 132_2 and 132_4 of the second frame portion 132, and is configured to connect the fixing portion 136 and the second frame portion 132. The fixing portion 136 of the second frame body 130 may be used for connecting the base 110. In detail, the fixing portion 136 may be fixed on the positioning portions 112 of the base 110 through locking members (not shown). Based on the above description, the second frame body 130 is configured to take the second shaft portion 134 as a rotation axis, such that the second frame body 130 may swing relative to the base 110 while taking an axis A2 passing through the second shaft portion 134 as the rotation axis. In some embodiment, an extending direction of the second shaft portion 134 is orthogonal to an extending direction of the first shaft portion 124. In other words, an included angle between an axial direction of the second shaft portion 134 and an axial direction of the first shaft portion 124 is 90 degrees, but the invention is not limited thereto. The second assembling portion 138 of the second frame body 130 may be used, for example, for clamping the second driving assembly 160, which will be described in detail below. It should be particularly noted that, in some other embodiments, in case that the second driving assembly 160 is not provided, the second frame body 130 may be removed.

In some embodiments, the optical element 140 is disposed in the first frame body 120. The optical element 140 is, for example, a light-transmitting element, and is configured to vibrate with reciprocating deflections of the first frame body 120 and the second frame body 130 implemented while taking the axis A1 and the axis A2 as rotation axes, respectively, so as to enhance a resolution of the image light beam L2 passing through the optical element 140.

In some embodiments, the at least one first driving assembly 150 is disposed between the base 110 and the first frame body 120. In detail, the first driving assembly 150 may be, for example, clamped between the assembling portion 114 of the base 110 and the first assembling portion 126 of the first frame body 120. In this way, the first frame body 120 may be configured to swing relative to the base 110 through a magnetic force generated by the first driving assembly 150. In the embodiment, an amount of the at least one first driving assembly 150 is two, and the two first driving assemblies 150 are respectively disposed on two opposite sides 122_2 and 122_4 of the first frame portion 122, but the invention is not limited thereto. In other embodiments, the amount of the at least one first driving assembly 150 may be one. Moreover, in the embodiment, the second frame body 130 is provided, so that the at least one first driving assembly 150 may also be regarded as being disposed between the first frame body 120 and the second frame body 130. In some embodiments, a driving signal may be provided to the at least one first driving assembly 150, and the first frame body 120 may be rotated relative to the base 110 in a direction D1 through the magnetic force generated by the at least one driving assembly 150.

The first driving assembly 150, for example, includes a first coil 152 and a first magnetic structure 154, where the first coil 152 and the first magnetic structure 154 face each other, and there is a gap between the first coil 152 and the first magnetic structure 154. The first coil 152 is, for example, disposed on two opposite sides of the base 110, and the first magnetic structure 154 is, for example, disposed on two opposite sides 122_2 and 122_4 of the first frame portion 122, but the invention is not limited thereto. In other embodiments, configuration positions of the first coil 152 and the first magnetic structure 154 may be exchanged with each other, i.e., the first coil 152 may be disposed on the two opposite sides 122_2 and 122_4 of the first frame portion 122, and the first magnetic structure 154 may be disposed on the two opposite sides of the base 110.

Figure 3A:
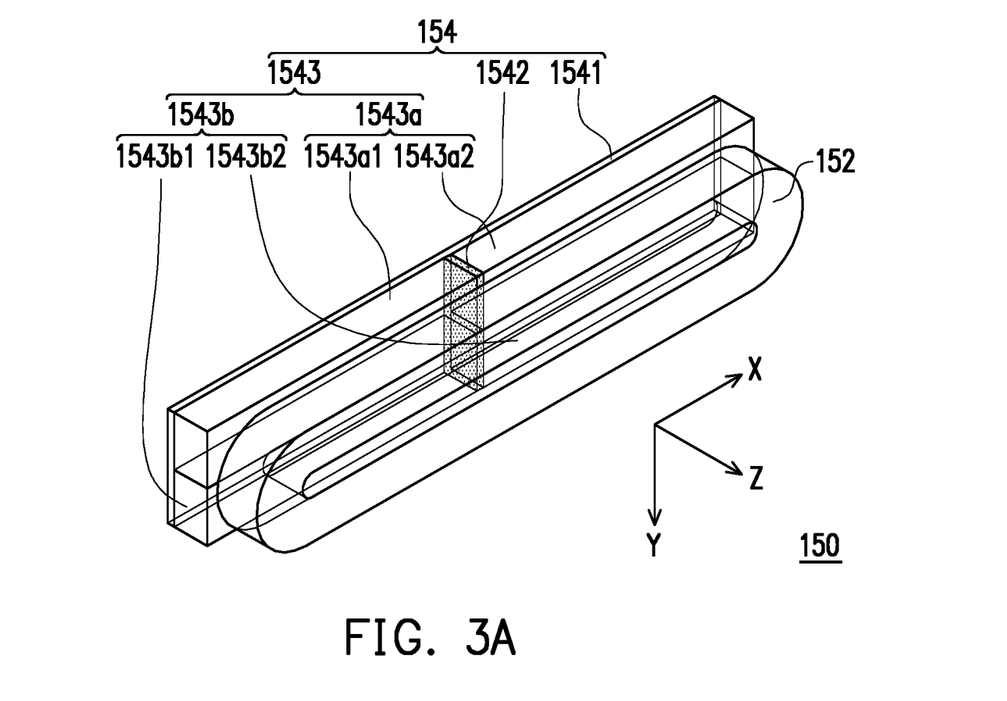
FIG. 3A is a schematic diagram of a first driving assembly according to the first embodiment of the invention.
Figure 3B:
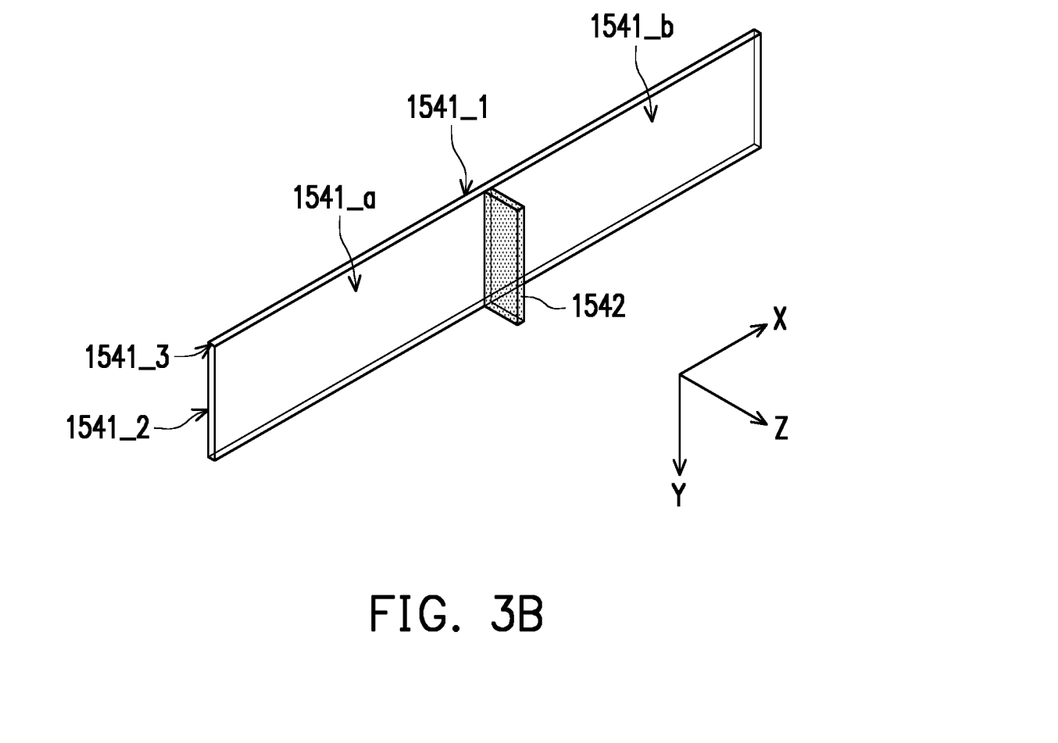
FIG. 3B is a schematic diagram of a relative arrangement relationship between a magnetic permeable plate and a separation medium according to the first embodiment of the invention.
Figure 4A:
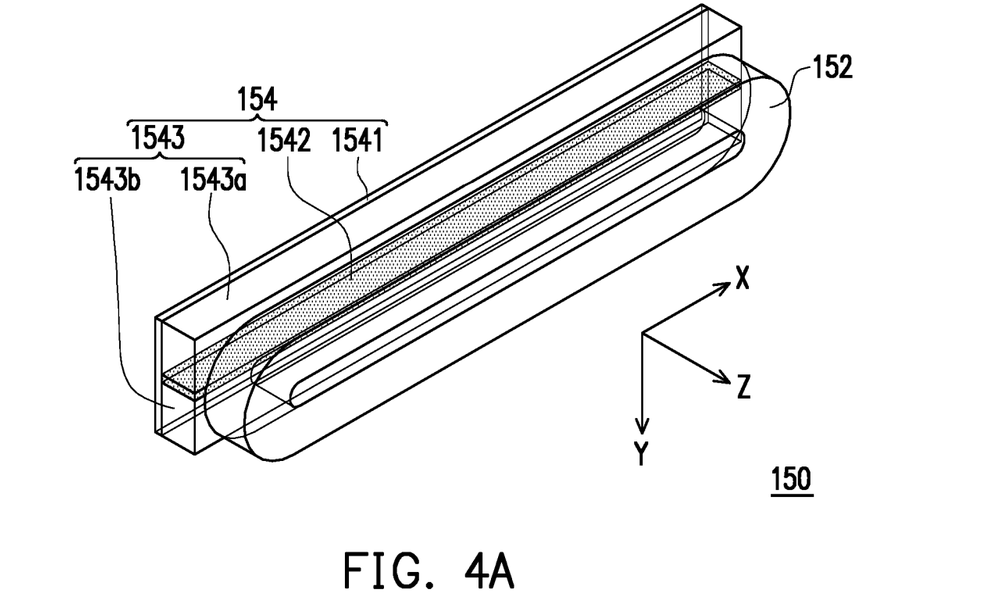
FIG. 4A is a schematic diagram of a first driving assembly according to a second embodiment of the invention.
Figure 4B:
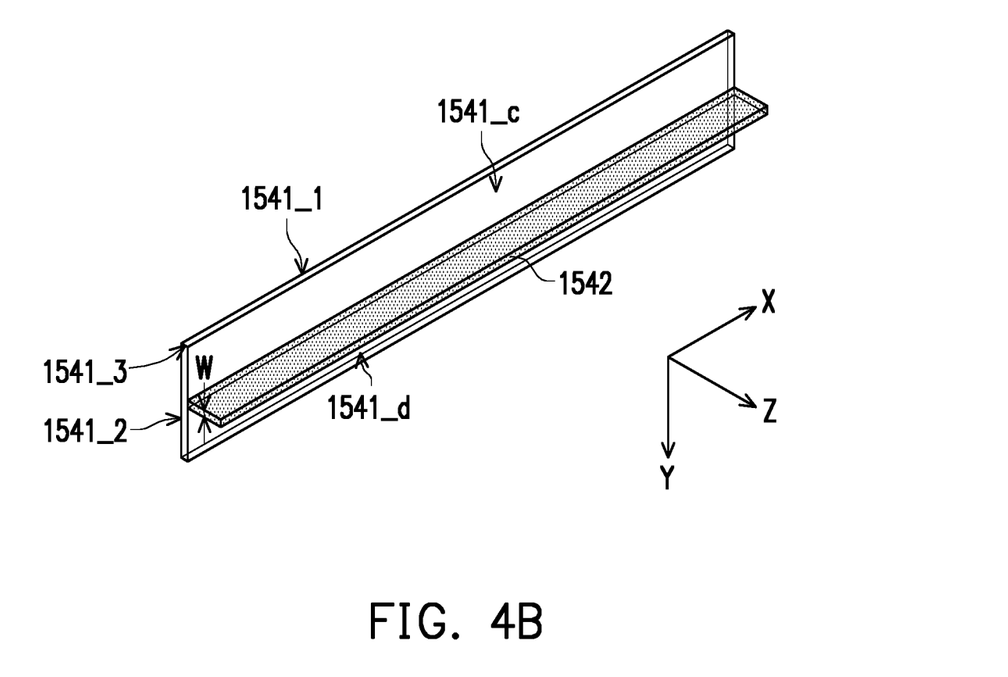
FIG. 4B is a schematic diagram of a relative arrangement relationship between a magnetic permeable plate and a separation medium according to the second embodiment of the invention.

FIG. 3A is a schematic diagram of a first driving assembly according to the first embodiment of the invention, and FIG. 3B is a schematic diagram of a relative arrangement relationship between a magnetic permeable plate and a separation medium according to the first embodiment of the invention. FIG. 4A is a schematic diagram of a first driving assembly according to a second embodiment of the invention, and FIG. 4B is a schematic diagram of a relative arrangement relationship between a magnetic permeable plate and a separation medium according to the second embodiment of the invention.

With reference to FIG. 3A, FIG. 3B, FIG. 4A and FIG. 4B, in some embodiments, the first magnetic structure 154 includes a magnetic permeable plate 1541, a separation medium 1542, and a magnet element 1543. The magnetic permeable plate 1541 is, for example, yoke iron, and has, for example, a rectangular sheet shape, but the invention is not limited thereto. The magnetic permeable plate 1541 may be used to, for example, attract the magnet element 1543 to increase an electromagnetic shielding effect of the first magnetic structure 154. In the embodiment, the magnetic conductive plate 1541 has a long side 1541_1 extending in an X direction, a short side 1541_2 extending in a Y direction, and a height 1541_3 extending in a Z direction. The long side 1541_1, for example, has a size of length of less than 22 mm in the X direction, the short side 1541_2 has a size of width of less than 3.5 mm in the Y direction, and the height 1541_3 has a size of height of less than 0.5 mm in the Z direction.

In some embodiment, the separation medium 1542 is located on one side of the magnetic permeable plate 1541 facing the first coil 152. In detail, the separation medium 1542 is disposed on a surface of the magnetic permeable plate 1541 facing the first coil 152. In the embodiment shown in FIG. 3A and FIG. 3B, the separation medium 1542 extends along the extending direction of the short side 1541_2 of the magnetic permeable plate 1541, i.e., along the Y direction, but the invention is not limited thereto. In the embodiment of FIG. 4A and FIG. 4B, the separation medium 1542 may extend along the extending direction of the long side 1541_1 of the magnetic permeable plate 1541, i.e., along the X direction. In some embodiments, the separation medium 1542 includes a non-magnetic permeable material. In detail, a material of the separation medium 1542 may be air, plastic, glass, or rubber. In the embodiment, the material of the separation medium 1542 is air. Since the separation medium 1542 of the embodiment includes the non-magnetic permeable material, a magnetic flux density throughout the first coil 152 may be increased to accordingly increase a Lorentz force of the first coil 152. But it should be noted that the invention is not limited thereto. In some other embodiments, the separation medium 1542 includes a magnetic permeable material. In detail, the material of the separation medium 1542 may be iron, cobalt, nickel, or other magnetic permeable materials. In some embodiments, shown as the configuration of FIG. 4A and FIG. 4B, when the separation medium 1542 extends along the extending direction of the long side 1541_1 of the magnetic permeable plate 1541, a width W of the separation medium 1542 in the extending direction of the short side 1541_2 of the magnetic permeable plate 1541 is less than 0.2 mm, i.e., in the embodiment, the width W of the separation medium 1542 in the Y direction is less than 0.2 mm. When the width W of the separation medium 1542 in the Y direction is less than 0.2 mm, the magnetic flux density throughout the first coil 152 may be increased to accordingly increase the Lorentz force of the first coil 152, and some exemplary embodiments are provided below for further description.

In some embodiments, the magnet element 1543 is disposed on one side of the magnetic permeable plate 1541 facing the first coil 152 and is separated by the separation medium 1542. In detail, in the embodiment, the separation medium 1542 may separate the magnetic permeable plate 1541 into two regions with substantially same areas, and the magnet element 1543 is separated by the magnetic permeable plate 1541 and is evenly disposed on the two regions. In detail, in the embodiment shown in FIG. 3A and FIG. 3B, the separation medium 1542 separates the magnetic permeable plate 1541 into two regions 1541_a and 1541_b, and in the embodiment shown in FIG. 4A and FIG. 4B, the separation medium 1542 separates the magnetic permeable plate 1541 into two regions 1541_c and 1541_d. In some embodiments, the magnet element 1543 includes a plurality of magnet elements arranged in the Y direction. In the embodiment shown in FIG. 3A and FIG. 3B, the magnet element 1543 includes a four-pole magnetic element, i.e., the magnet element 1543 includes two magnets 1543a and 1543b arranged in the Y direction, where magnetic poles of the magnets 1543a and 1543b are opposite to each other. The magnet 1543a and the magnet 1543b, for example, respectively have a size of length of less than 22 mm in the X direction, and respectively have a size of height of less than 3.2 mm in the Z direction, and a sum of widths of the magnet 1543a and the magnet 1543b in the Y direction is, for example, less than 3.5 mm. In the embodiment shown in FIG. 3A, the magnet 1543a and the magnet 1543b are all separated by the separation medium 1542 to respectively form magnets 1543a1 and 1543a2, and magnets 1543b1 and 1543b2, where the magnet 1543a1 and the magnet 1543b1 are disposed on the region 1541_a, and the magnet 1543a2 and the magnet 1543b2 are disposed on the region 1541_b. In the embodiment shown in FIG. 4A, the magnet 1543a and the magnet 1543b are separated from each other by the separation medium 1542, where the magnet 1543a is disposed on the region 1541_c, and the magnet 1543b is disposed on the region 1541_d.

Figure 5:
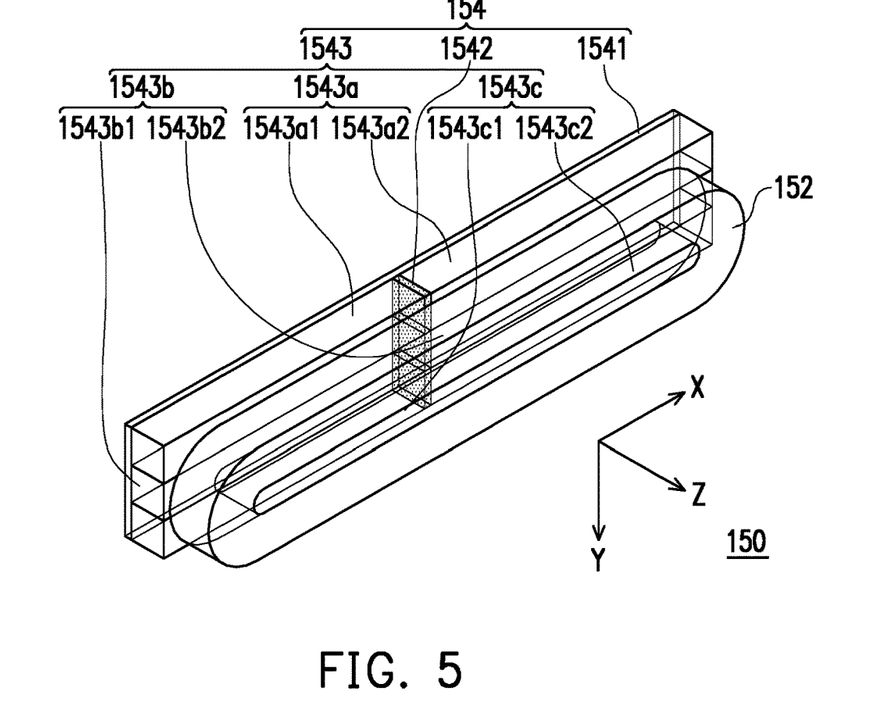
FIG. 5 is a schematic diagram of a first driving assembly according to a third embodiment of the invention.
Figure 6:
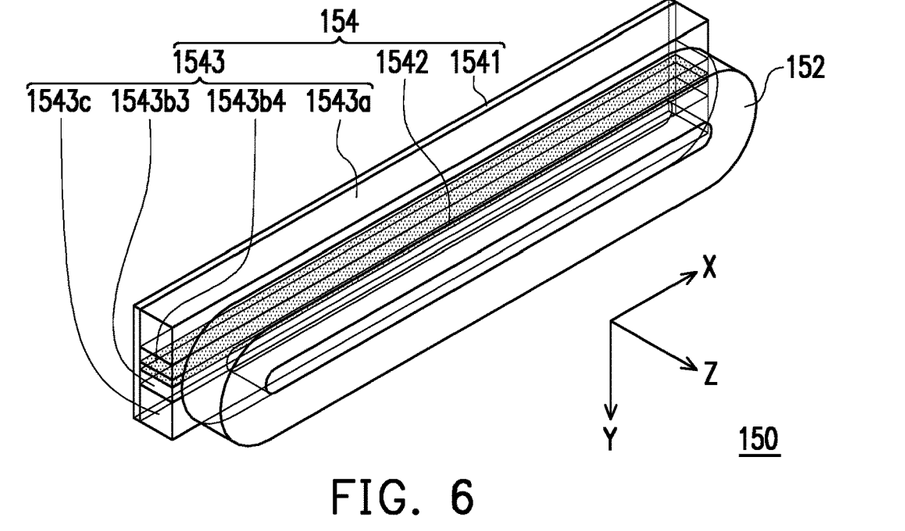
FIG. 6 is a schematic diagram of a first driving assembly according to a fourth embodiment of the invention.

FIG. 5 is a schematic diagram of a first driving assembly according to a third embodiment of the invention, and FIG. 6 is a schematic diagram of a first driving assembly according to a fourth embodiment of the invention.

With reference to FIG. 5 and FIG. 6, in some other embodiments, the magnet element 1543 may be a Halbach array structure, i.e., the magnet element 1543 may include more than two magnets arranged in the Y direction. In the embodiments of FIG. 5 and FIG. 6, the magnet element 1543 is the Halbach array structure including three magnets 1543a, 1543b, and 1543c arranged in the Y direction, but it should be noted that an amount of the above-mentioned magnets is not limited thereto. The magnets 1543a, 1543b and 1543c respectively have a size of length of less than 22 mm in the X direction, and respectively have a size of height of less than 3.2 mm in the Z direction, and a sum of widths of the magnets 1543a, 1543b and 1543c in the Y direction is, for example, less than 3.5 mm. In the embodiment of FIG. 5, the magnet 1543a, the magnet 1543b, and the magnet 1543c are all separated by the separation medium 1542 to respectively form magnets 1543a1 and 1543a2, magnets 1543b1 and 1543b2, and magnets 1543c1 and 1543c2, where the magnet 1543a1, the magnet 1543b1, and the magnet 1543c1 are disposed on the region 1541_a, and the magnet 1543a2, the magnet 1543b2 and the magnet 1543c2 are disposed on area 1541_b. In the embodiment of FIG. 6, the magnet 1543b is separated into magnets 1543b3 and 1543b4 by the separation medium 1542, where the magnet 1543a and the magnet 1543b4 are disposed on the region 1541_c, and the magnet 1543c and the magnet 1543b3 are disposed on the region 1541_d. The magnets 1543a, 1543b, and 1543c mentioned above may be, for example, permanent magnets, but the invention is not limited thereto.

Referring back to FIG. 2, in the embodiment, the at least one second driving assembly 160 is disposed between the base 110 and the second frame body 130. In detail, the second driving assembly 160 may be, for example, clamped between the assembling portion 116 of the base 110 and the second assembling portion 138 of the second frame body 130. In this way, the second frame body 130 may be configured to swing relative to the base 110 through a magnetic force generated by the second driving assembly 160. In the embodiment, an amount of the at least one second driving assembly 160 is two, and the two second driving assemblies 160 are respectively disposed on two opposite sides 132_1 and 132_3 of the second frame portion 132, i.e., the optical module 100 of the embodiment may be regarded as a dual-axis bilaterally driven actuator, but the invention is not limited thereto. In some other embodiments, the amount of the at least one second driving assembly 160 may be one. In some other embodiments, no second driving assembly 160 may be configured. In some embodiments, a driving signal may be provided to the at least one second driving assembly 160, and the second frame body 130 may be rotated relative to the base 110 in a direction D2 through a magnetic force generated by the at least one second driving assembly 160.

The second driving assembly 160, for example, includes a second coil 162 and a second magnetic structure 164, where the second coil 162 and the second magnetic structure 164 face each other, and there is a gap between the second coil 162 and the second magnetic structure 164. The second coil 162 is, for example, disposed on two opposite sides of the base 110, and the second magnetic structure 164 is, for example, disposed on two opposite sides 132_1 and 132_3 of the second frame portion 132, but the invention is not limited thereto. In other embodiments, configuration positions of the second coil 162 and the second magnetic structure 164 may be exchanged with each other, i.e., the second coil 162 may be disposed on the two opposite sides 132_1 and 132_3 of the second frame portion 132, and the second magnetic structure 164 may be disposed on the two opposite sides of the base 110.

In some embodiments, the second driving assembly 160 may have the same or similar structure as the first driving assembly 150. In detail, the second driving assembly 160 may also include the above-mentioned magnetic permeable plate 1541, the separation medium 1542, and the magnet element 1543. The above embodiment may be referred for materials and components of the magnetic permeable plate, the separation medium, and the magnet element included in the second driving assembly 160, and details thereof are not repeated.

In the embodiment, the first driving assembly 150 and the second driving assembly 160 in the optical module 100 may be respectively applied with driving signals to actuate the first frame body 120 and the second frame body 130, respectively. In this way, the first frame body 120 may be rotated relative to the base 110 through the first shaft portion 124, and the second frame body 130 may be rotated relative to the base 110 through the second shaft portion 134, so that the image light beam is refracted to four positions due to the rotation of the optical element 140 disposed inside the first frame body 120. Therefore, an image with a resolution four times greater than an original resolution may be synthesized by quickly moving the image light beam within one frame, so as to obtain a higher 2K resolution image or a 4K resolution image.

Figure 7:
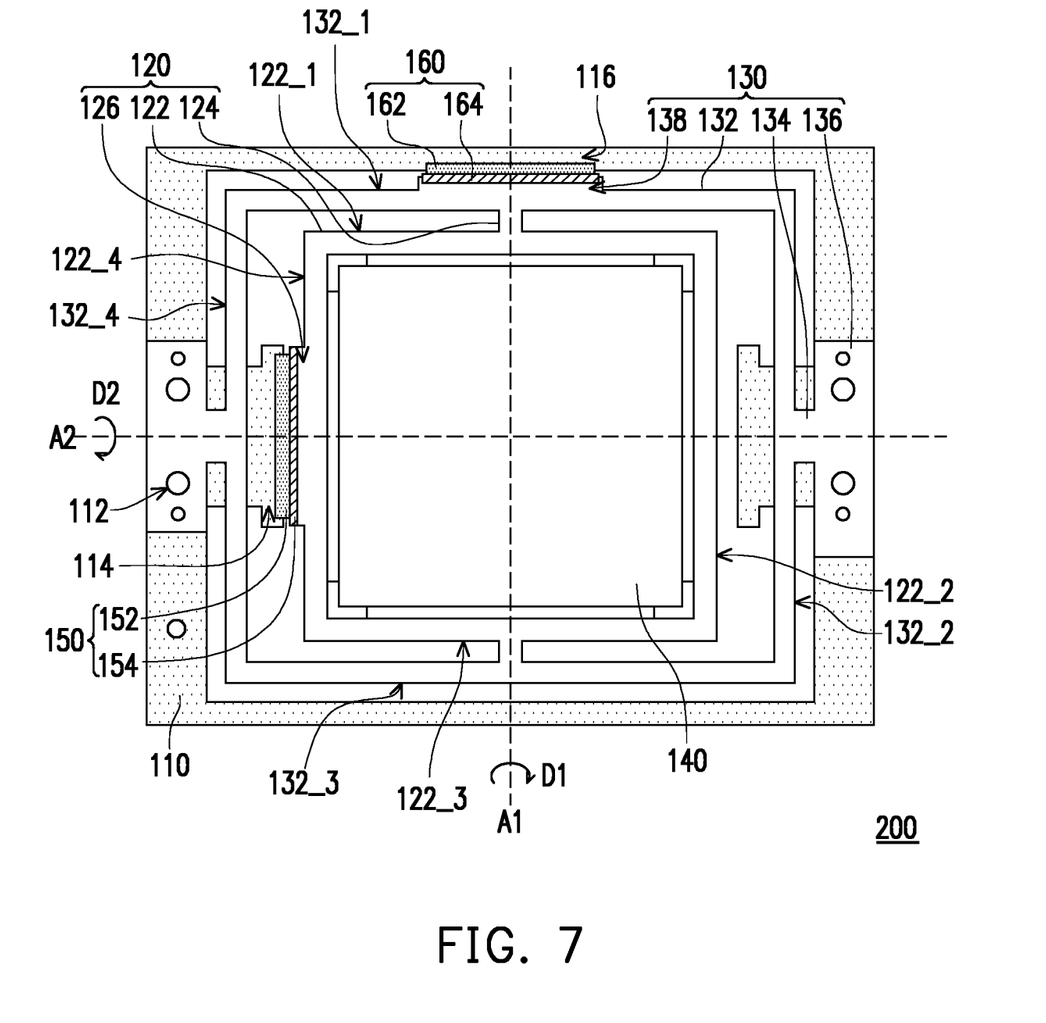
FIG. 7 is a schematic diagram of the optical module depicted in FIG. 1 according to the second embodiment of the invention.

FIG. 7 is a schematic diagram of the optical module depicted in FIG. 1 according to the second embodiment of the invention. It should be noted that the reference numbers of the components and a part of contents of the embodiment of FIG. 2 may also be used in the embodiment of FIG. 7, where the same or similar reference numbers denote the same or like components, and descriptions of the same technical contents are omitted.

With reference to FIG. 7, a main difference between the optical module 200 of the embodiment and the optical module 100 is that the optical module 200 only includes one first driving assembly 150 and one second driving assembly 160, where the first driving assembly 150 is located between the first frame body 120 and the second frame body 130, and the second driving assembly 160 is located between the second frame body 130 and the base 110, i.e. the optical module 200 of the embodiment may be regarded as a dual-axis unilaterally driven actuator. The first coil 152 of the first driving assembly 150 of the embodiment is, for example, disposed on one side of the base 110, and the first magnetic structure 154 is, for example, disposed on the side 122_4 of the first frame portion 122. In addition, the second coil 162 included in the second driving assembly 160 of the embodiment is, for example, disposed on the other side of the base 110, and the second magnetic structure 164 is, for example, disposed on the side 132_1 of the second frame portion 132.

Figure 8:
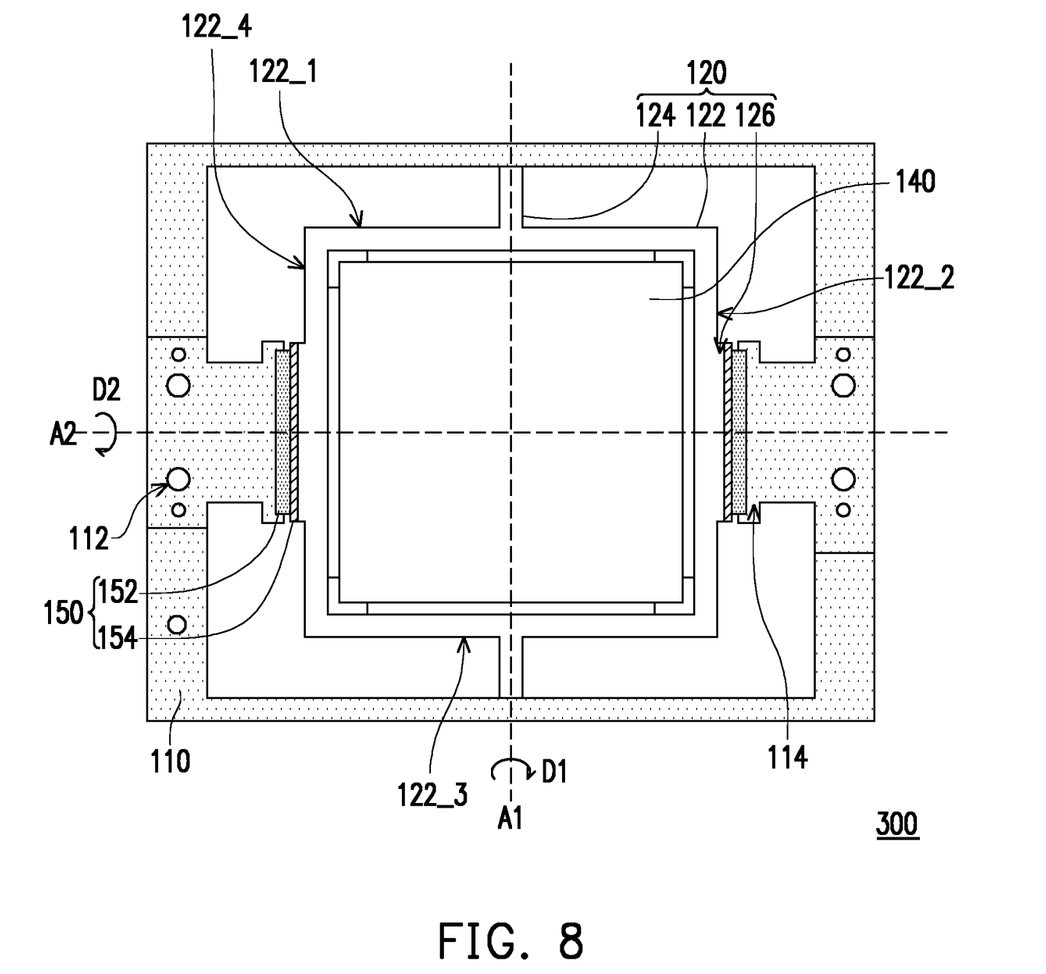
FIG. 8 is a schematic diagram of the optical module depicted in FIG. 1 according to the third embodiment of the invention.

FIG. 8 is a schematic diagram of the optical module depicted in FIG. 1 according to the third embodiment of the invention. It should be noted that the reference numbers of the components and a part of contents of the embodiment of FIG. 2 may also be used in the embodiment of FIG. 8, where the same or similar reference numbers denote the same or like components, and descriptions of the same technical contents are omitted.

With reference to FIG. 8, a main difference between the optical module 300 of the embodiment and the optical module 100 is that the optical module 300 does not include the second frame body 130 and the second driving assembly 160, where the first driving assembly 150 is located between the first frame body 120 and the base 110, i.e., the optical module 300 of the embodiment may be regarded as a single-axis bilaterally driven actuator. The first frame body 120 of the embodiment is disposed in the base 110 and is connected to the base 110. In detail, the first shaft portion 124 of the first frame body 120 is connected to the base 110.

Figure 9:
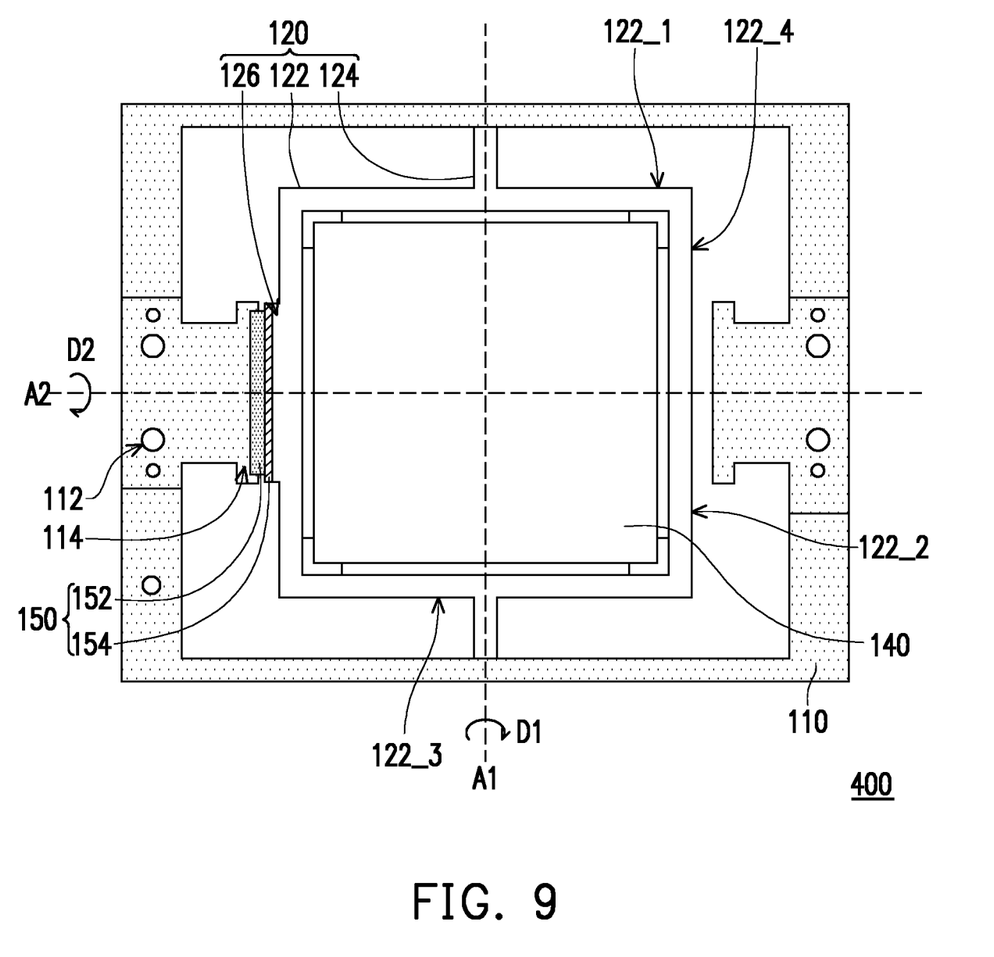
FIG. 9 is a schematic diagram of the optical module depicted in FIG. 1 according to the fourth embodiment of the invention.

FIG. 9 is a schematic diagram of the optical module depicted in FIG. 1 according to the fourth embodiment of the invention. It should be noted that the reference numbers of the components and a part of contents of the embodiment of FIG. 2 may also be used in the embodiment of FIG. 9, where the same or similar reference numbers denote the same or like components, and descriptions of the same technical contents are omitted.

With reference to FIG. 9, a main difference between the optical module 400 of the embodiment and the optical module 100 is that the optical module 400 does not include the second frame body 130 and the second driving assembly 160, and only includes one first driving assembly 150, where the first driving assembly 150 is located between the first frame body 120 and the base 110, i.e., the optical module 400 of the embodiment may be regarded as a single-axis unilaterally driven actuator. The first frame body 120 of the embodiment is disposed in the base 110 and is connected to the base 110. In detail, the first shaft portion 124 of the first frame body 120 is connected to the base 110. The first coil 152 of the first driving assembly 150 is, for example, disposed on one side of the base 110, for example, disposed on the side 122_4, and the first magnetic structure 154 is, for example, disposed on the side 122_4 of the first frame portion 122.

In the above embodiment, the optical modules 100, 200, 300, and 400 perform optical vibrations deflected while taking the axis A1 or A2 as the rotation axis by using the driving assembly 150 and/or the driving assembly 160, so as to enhance the resolution of the image light beam L2 converted by the light valve 14. However, in other embodiments that are not illustrated, the driving assembly 150 and/or the driving assembly 160 of the invention may also be used in optical modules performing other types of optical vibrations. For example, the driving assembly 150 and/or the driving assembly 160 may be used in an optical module that performs vibration in a translation manner or in a circular track manner, etc., and the optical element configured in the optical module is, for example, a diffusing element or a micro lens array element, etc. In this way, the optical module may be used for reducing a laser light spot.

Some illustrative comparative embodiments are provided below to describe situations when structures of the separation medium 1542 and the magnet element 1543 included in the first driving assembly 150 are different. It should be noted that since the materials and components of the second driving assembly 160 and the first driving assembly 150 are the same or similar, the following illustrative comparative embodiments are also applicable to the second driving assembly 160.

Comparative Embodiment 1

In the following description, a situation that the magnet element 1543 included in the first magnetic structure 154 is a four-pole magnet element is used to describe situations of presence and absence of the separation medium 1542. When the first magnetic structure 154 does not include the separation medium 1542, the Lorentz force of the first coil 152 is 5.50105 mN. However, in an exemplary embodiment, when the first magnetic structure 154 includes the separation medium 1542 extending in the Y direction, the Lorentz force of the first coil 152 is 5.952278 mN. In another exemplary embodiment, when the first magnetic structure 154 includes the separation medium 1542 extending in the X direction, the Lorentz force of the first coil 152 is 5.992464 mN. It is known from the above exemplary embodiment that by including the separation medium 1542 in the first magnetic structure 154 in the embodiment, a magnetic flux density throughout the first coil 152 may be increased to increase the Lorentz force of the first coil 152.

Comparative Embodiment 2

In the following description, a situation that the magnet element 1543 of the first magnetic structure 154 is a Halbach array structure of three magnets arranged in the Y direction is used to describe situations of presence and absence of the separation medium 1542. When the first magnetic structure 154 does not include the separation medium 1542, the Lorentz force of the first coil 152 is 6.376157 mN. However, in an exemplary embodiment, when the first magnetic structure 154 includes the separation medium 1542 extending in the Y direction, the Lorentz force of the first coil 152 is 7.457245 mN. In another exemplary embodiment, when the first magnetic structure 154 includes the separation medium 1542 extending in the X direction, the Lorentz force of the first coil 152 is 7.154137 mN. It is known from the above exemplary embodiment that by including the separation medium 1542 in the first magnetic structure 154 in the embodiment, the magnetic flux density throughout the first coil 152 may be increased to increase the Lorentz force of the first coil 152.

Comparative Embodiment 3

In the following description, a situation that the magnet element 1543 included in the first magnetic structure 154 is a four-pole magnet element is used to describe the situation that the separation medium 1542 has different widths W in the Y direction. When the first magnetic structure 154 includes the separation medium 1542 having the width W of 0 mm in the Y direction (i.e., the separation medium 1542 is not included), the Lorentz force of the first coil 152 is 5.50105 mN. However, in an exemplary embodiment, shown as the configuration of FIG. 4A and FIG. 4B, when the separation medium 1542 extends along the extending direction of the long side 1541_1 of the magnetic permeable plate 1541, and when the first magnetic structure 154 includes the separation medium 1542 having the width W of 0.15 mm in the Y direction, the Lorentz force of the first coil 152 is 5.944 mN. In another exemplary embodiment, when the separation medium 1542 extends along the extending direction of the long side 1541_1 of the magnetic permeable plate 1541, and when the first magnetic structure 154 includes the separation medium 1542 having the width W of 0.10 mm in the Y direction, the Lorentz force of the first coil 152 is 5.9931 mN. In still another exemplary embodiment, when the separation medium 1542 extends along the extending direction of the long side 1541_1 of the magnetic permeable plate 1541, and when the first magnetic structure 154 includes the separation medium 1542 having the width W of 0.05 mm in the Y direction, the Lorentz force of the first coil 152 is 6.0218 mN. It may be known from the above exemplary embodiment that when the width W of the separation medium 1542 in the Y direction is less than 0.2 mm, the magnetic flux density throughout the first coil 152 may be increased, thereby increasing the Lorentz force of the first coil 152.

To sum up, the embodiments of the invention have at least one of following advantages or effects. In the optical module provided in one or more embodiments of the invention, the magnetic structure includes the separation medium made of the non-magnetic permeable material to separate the magnet elements, whereby a magnetic flux density throughout the coil is increased, and the Lorentz force of the coil is accordingly increased. As such, a frequency of reciprocating deflection of the optical module is increased. When the driving signal is applied to the driving assembly to actuate the first frame body and/or the second frame body, the image light beam is refracted to multiple positions due to the rotation of the optical element disposed in the first frame body. Therefore, an image with a resolution several times greater than an original resolution may be synthesized by quickly moving the image light beam within one frame, so that a higher 2K resolution image or a 4K resolution image may be obtained. Moreover, in the optical module provided in one or more embodiments of the invention, by designing a range of the width of the separation medium, the magnetic flux density throughout the coil may be further increased, thereby increasing the Lorentz force of the coil and increasing the frequency of reciprocating deflection of the optical module.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. An optical module, comprising a base, a first frame body, an optical element, and at least one driving assembly, wherein:

the first frame body is disposed in the base;

the optical element is disposed in the first frame body; and the at least one driving assembly is disposed between the base and the first frame body, the first frame body is configured to swing relative to the base through a magnetic force generated by the at least one driving assembly, and each of the at least one driving assembly comprises a coil and a magnetic structure, wherein the magnetic structure is separated from the coil, and the magnetic structure comprises a magnetic permeable plate, a separation medium, and a magnet element, wherein:

the magnetic permeable plate comprises a long side and a short side;

the separation medium is located on one side of the magnetic permeable plate facing the coil; and the magnet element is disposed on the one side of the magnetic permeable plate facing the coil and is separated by the separation medium.

2. The optical module according to claim 1, wherein the separation medium extends along an extending direction of the short side of the magnetic permeable plate.

3. The optical module according to claim 1, wherein the separation medium extends along an extending direction of the long side of the magnetic permeable plate.

4. The optical module according to claim 2, wherein a width of the separation medium in the extending direction of the short side of the magnetic permeable plate is less than 0.2 mm.

5. The optical module according to claim 1, wherein the separation medium comprises a non-magnetic permeable material.

6. The optical module according to claim 1, wherein the separation medium comprises a magnetic permeable material.

7. The optical module according to claim 1, wherein the magnet element is a four-pole magnet element, and comprises two magnets arranged along an extending direction of the short side of the magnetic permeable plate.

8. The optical module according to claim 1, wherein the magnet element has a Halbach array structure, and comprises a plurality of magnets arranged along an extending direction of the short side of the magnetic permeable plate.

9. The optical module according to claim 1, wherein an amount of the at least one driving assembly is two, and the two driving assemblies are respectively located at opposite sides of the first frame body.

10. The optical module according to claim 1, further comprising a second frame body connected to the base, wherein the first frame body is disposed in the second frame body and is connected to the second frame body, an amount of the at least one driving assembly is two, one of the two driving assemblies is located between the first frame body and the second frame body, the other one of the two driving assemblies is located between the second frame body and the base, and the first frame body and the second frame body are configured to respectively swing relative to the base through magnetic forces generated by the two driving assemblies.

11. The optical module according to claim 1, further comprising a second frame body connected to the base, wherein the first frame body is disposed in the second frame body and is connected to the second frame body, an amount of the at least one driving assembly is four, two of the four driving assemblies are located between the first frame body and the second frame body and respectively located at opposite sides of the first frame body, and the other two of the four driving assemblies are located between the second frame body and the base and respectively located at opposite sides of the second frame body, and the first frame body and the second frame body are configured to respectively swing relative to the base through magnetic forces generated by the four driving assemblies.

12. A projector, comprising an illumination system, a light valve, a projection lens, and an optical module, wherein the illumination system is configured to emit an illumination light beam;

the light valve is located on a transmission path of the illumination light beam and is configured to convert the illumination light beam into an image light beam;

the projection lens is located on a transmission path of the image light beam and is configured to project the image light beam; and the optical module is disposed between the light valve and the projection lens and comprises a base, a first frame body, an optical element, and at least one driving assembly, wherein the first frame body is disposed in the base;

the optical element is disposed in the first frame body; and the at least one driving assembly is disposed between the base and the first frame body, the first frame body is configured to swing relative to the base through a magnetic force generated by the at least one driving assembly, and each of the at least one driving assembly comprises a coil and a magnetic structure, wherein the magnetic structure is separated from the coil, and the magnetic structure comprises a magnetic permeable plate, a separation medium, and a magnet element, wherein the magnetic permeable plate comprises a long side and a short side;

the separation medium is located on one side of the magnetic permeable plate facing the coil; and the magnet element is disposed on the one side of the magnetic permeable plate facing the coil and is separated by the separation medium.

* * * * *